United States Patent
Liang

(10) Patent No.: US 8,168,912 B1
(45) Date of Patent: May 1, 2012

(54) ELECTRODE FOR SHAPED FILM COOLING HOLE

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 405 days.

(21) Appl. No.: 12/389,007

(22) Filed: Feb. 19, 2009

(51) Int. Cl.
*B23H 1/04* (2006.01)
*B23H 9/10* (2006.01)

(52) U.S. Cl. .................................................. 219/69.15

(58) Field of Classification Search ............... 219/69.15; 415/116, 415; 416/97 R
See application file for complete search history.

(56) References Cited

U.S. PATENT DOCUMENTS

| | | | |
|---|---|---|---|
| 4,650,949 A | 3/1987 | Field | |
| 4,664,597 A * | 5/1987 | Auxier et al. | 416/97 R |
| 4,684,323 A | 8/1987 | Field | |
| 4,819,325 A * | 4/1989 | Cross et al. | 219/69.15 |
| 4,922,076 A | 5/1990 | Cross et al. | |
| 5,382,133 A * | 1/1995 | Moore et al. | 415/115 |
| 6,897,401 B2 * | 5/2005 | Kildea | 219/69.15 |
| 6,979,176 B2 | 12/2005 | Nakamata et al. | |
| 7,220,934 B2 * | 5/2007 | Paauwe et al. | 219/69.15 |
| 7,246,992 B2 | 7/2007 | Lee | |
| 7,328,580 B2 | 2/2008 | Lee et al. | |
| 2006/0171807 A1 * | 8/2006 | Lee | 416/97 R |
| 2007/0025852 A1 * | 2/2007 | Camhi et al. | 416/97 R |
| 2008/0031738 A1 * | 2/2008 | Lee | 416/97 R |

* cited by examiner

*Primary Examiner* — Geoffrey S Evans
(74) *Attorney, Agent, or Firm* — John Ryznic

(57) ABSTRACT

An electrode used to form a film cooling hole in an air cooled turbine airfoil using the electrode discharge machining process. The electrode includes a number of film hole forming projections each having a metering hole forming section and a diffusion forming section. The diffusion forming section has a trapezoidal shape in which two sidewalls have both an outward expansion and are slanted outward to form a convergent diffusion or slanted inward to form a divergent diffusion.

8 Claims, 5 Drawing Sheets

ELECTRODE FOR SHAPED FILM COOLING HOLE

FEDERAL RESEARCH STATEMENT

None.

CROSS-REFERENCE TO RELATED APPLICATIONS

None.

BACKGROUND OF THE INVENTION

1. Field of the Invention

The present invention relates generally to a turbine airfoil with film cooling holes, and more specifically to an electrode for forming the film cooling holes.

2. Description of the Related Art including information disclosed under 37 CFR 1.97 and 1.98

A gas turbine engine includes a turbine section with multiple rows of stator vanes and rotor blades that interact with a hot gas flow to extract mechanical energy used to drive a bypass fan in the case of an aero engine or drive an electric generator in the case of an industrial gas turbine (IGT) engine. The efficiency of the engine can be increased by passing a higher temperature gas flow into the turbine. However, the turbine inlet temperature is limited to the material properties of the airfoils and the cooling effectiveness of these airfoils. The first stage airfoils are exposed to the highest temperature gas flow. Thus, it is the first stage airfoils that typically limited the turbine inlet temperature.

An improvement in the cooling effectiveness of an airfoil can include better convective cooling, impingement cooling or film cooling or a combination of these three types of cooling. The key to better cooling effectiveness is controlling the metal temperature of the airfoil. The higher the metal temperature, the more likely hot spots will occur that produce erosion, or the higher thermal stress will result in excessive creep damage or other stress induced problems that severely limit the part life. In an IGT, part life is critical since these engines operate continuously for period in excess of 48,000 hours before being shut down for service and repair.

In the prior art, a film cooling flow channel includes a straight circular entrance region of constant diameter that forms a flow metering portion for the film hole. Following the metering section is a single diffusion section that opens onto the airfoil surface. The conical diffusion section is used to reduce the cooling air flow momentum or exit velocity. Normally, an expansion area ratio of 2 to 6 times the metering section area is used in the prior art airfoil film cooling hole design. This type of film cooling hole construction can be found in most of the current diffusion holes which are widely used in the current film cooling design for airfoils. The shaped film hole includes a 10 degree downstream expansion (in the direction of the hot gas flow over the film hole) and a 10 degree spanwise expansion in the radial outward and radial inward directions. No expansion is used in the upstream direction. U.S. Pat. No. 4,684,323 issued to Field on Aug. 4, 1987 and entitled FILM COOLING PASSAGES WITH CURVED CORNERS discloses this type of film cooling hole. An expansion in the upstream direction will entrain the hot gas into the film cooling hole at the exit plane where the film cooling hole merges with the airfoil surface. As a result of the hot gas entrainment, shear mixing with the ejecting cooling air will result which degrades the film effectiveness level of the film cooling air.

Film cooling holes are formed using an electrode that has the shape of the film cooling hole which is used to burn or melt away (using the EDM or electrode discharge machining process) the airfoil material and leave the film cooling hole with the desired shape. U.S. Pat. No. 4,650,949 issued to Field on Mar. 17, 1987 and entitled ELECTRODE FOR ELECTRICAL DISCHARGE MACHINING FILM COOLING PASSAGES IN AN AIRFOIL discloses the sheet metal form of an electrode that is used in the early periods to produce the 10×10×10 shaped diffusion holes by the electrode discharge machining (EDM) process.

The sheet metal electrode has evolved into a three dimensional solid electrode. The solid electrode produces the prior art 10×10×10 diffusion shaped film hole used in the current turbine airfoil cooling holes. The foot print is in a trapezoid shape with four straight sidewalls. The central axis of the metering hole is tangent with the upper sidewall of the trapezoid while the sidewalls are perpendicular to the film hole upstream and downstream walls.

A three dimensional diffusion hole in a compound angled orientation to the mainstream gas flow with a variety of expansion angles are also used in the airfoil cooling design for further enhancement of the film cooling capability. FIG. 3 shows an electrode for forming this compound angle shaped diffusion hole with zero expansion angle on the spanwise radial direction and 10 degrees expansion in the spanwise downstream and streamwise downstream directions. FIG. 4 shows a side view of the electrode in FIG. 3. The prior art three dimensional diffusion shaped film hole is constructed with both sidewalls perpendicular to the film hole upstream and downstream walls. A further improvement over the prior art traditional standard 3D diffusion can be achieved by convergent or divergent sidewalls.

BRIEF SUMMARY OF THE INVENTION

It is an object of the present invention to provide for a turbine airfoil with a film cooling hole that will provide for a lower metal temperature than in the prior art airfoils.

The present invention is a film cooling hole with a constant diameter metering section followed by a convergent or a divergent sidewall shaped diffusion hole in which the diffusion section includes multiple expansion with either divergent sidewalls or convergent sidewalls. The sidewalls in a radial expansion direction are angled at a convergent angle of 10 to 45 degrees inward. This forms a trapezoid shaped diffuser with a smaller opening on the hot side next to the mainstream gas flow and wider opening next to the blade surface. A larger film cooling hole breakout and footprint over the cited prior art references is formed which results in a better film coverage and thus better film cooling.

In another embodiment, a divergent sidewall shaped diffusion hole is used in which the film cooling hole includes a multiple expansion diffusion section with sidewalls in the radial expansion direction include an additional divergent angles at 10 to 45 degrees opposite to the first embodiment such that the sidewalls slant toward the top portion of the airfoil wall. The bottom side of the diffusion section is smaller than the top side in this embodiment.

DETAILED DESCRIPTION OF THE INVENTION

Figure 1:
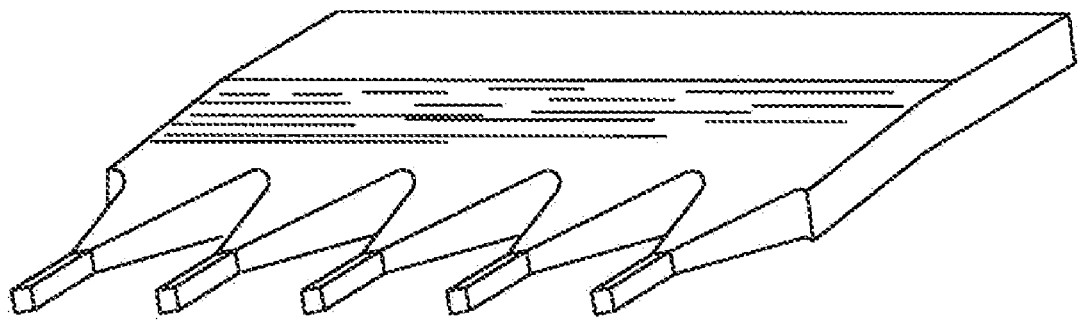
FIG. 1 shows a prior art electrode used to form the prior art shaped film cooling hole.
Figure 2:
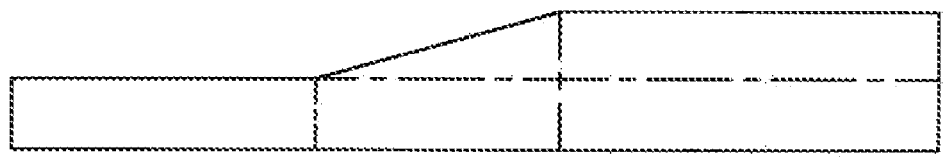
FIG. 2 shows a cross section side view of the prior art electrode of FIG. 1.
Figure 3:
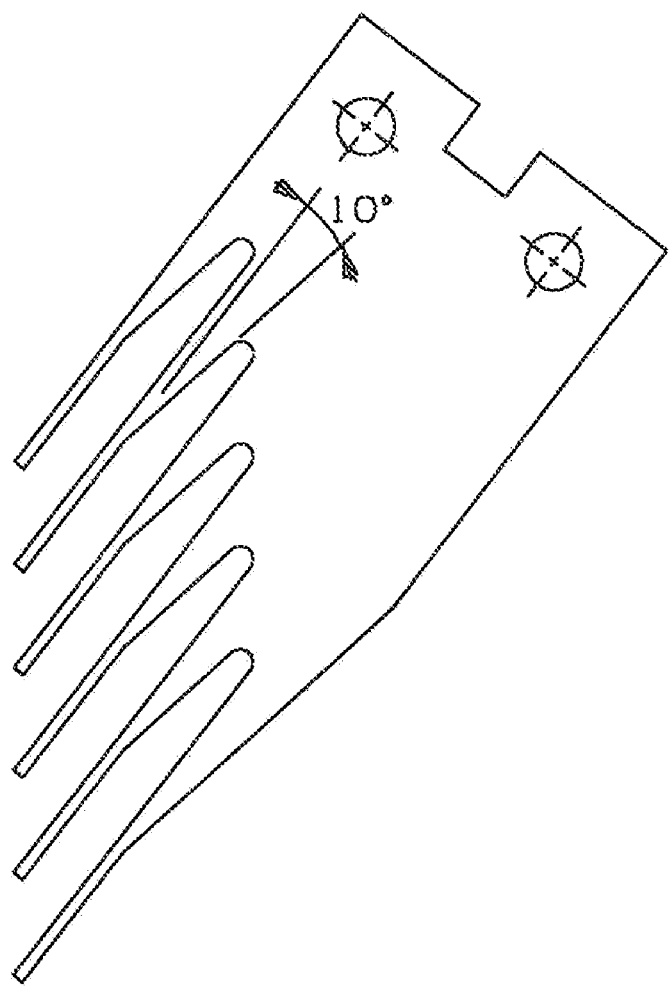
FIG. 3 shows a prior art electrode used to form a compound angled film cooling hole.
Figure 4:
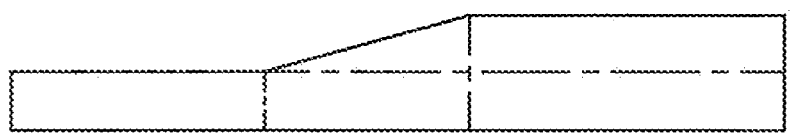
FIG. 4 shows a cross section side view of the prior art electrode of FIG. 3.
Figure 5:
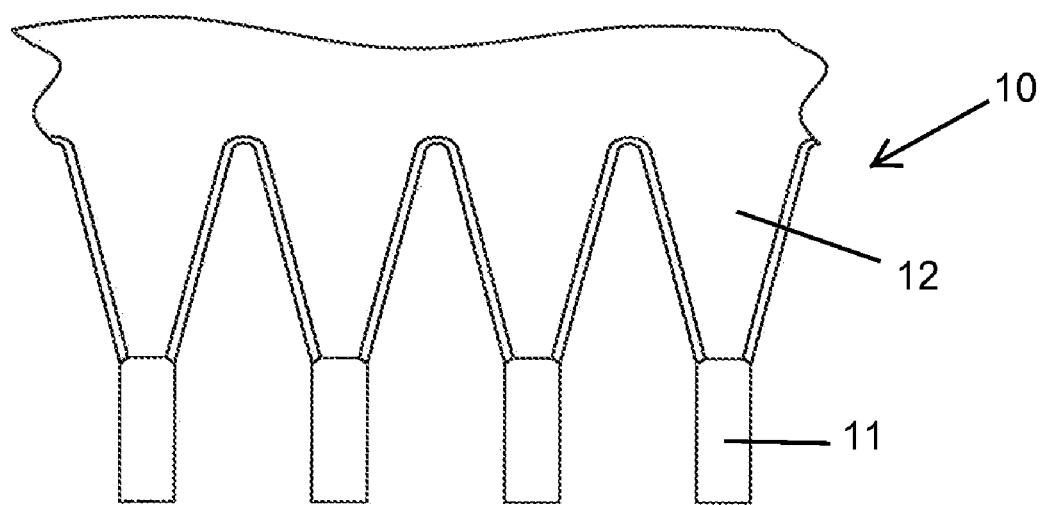
FIG. 5 shows a cross section top view of the convergent electrode of the present invention used to form a film cooling hole.
Figure 6:
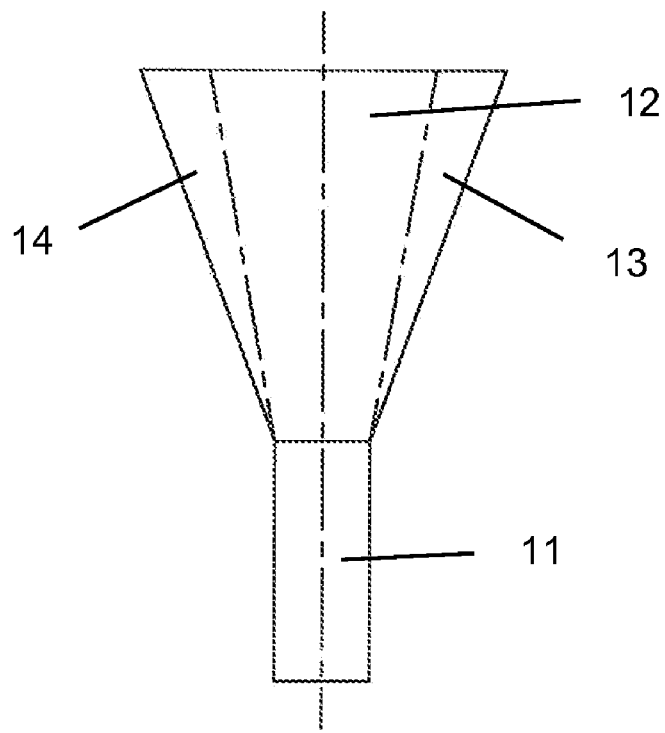
FIG. 6 shows a close-up view of one of the single point convergent electrode of FIG. 5.
Figure 10:
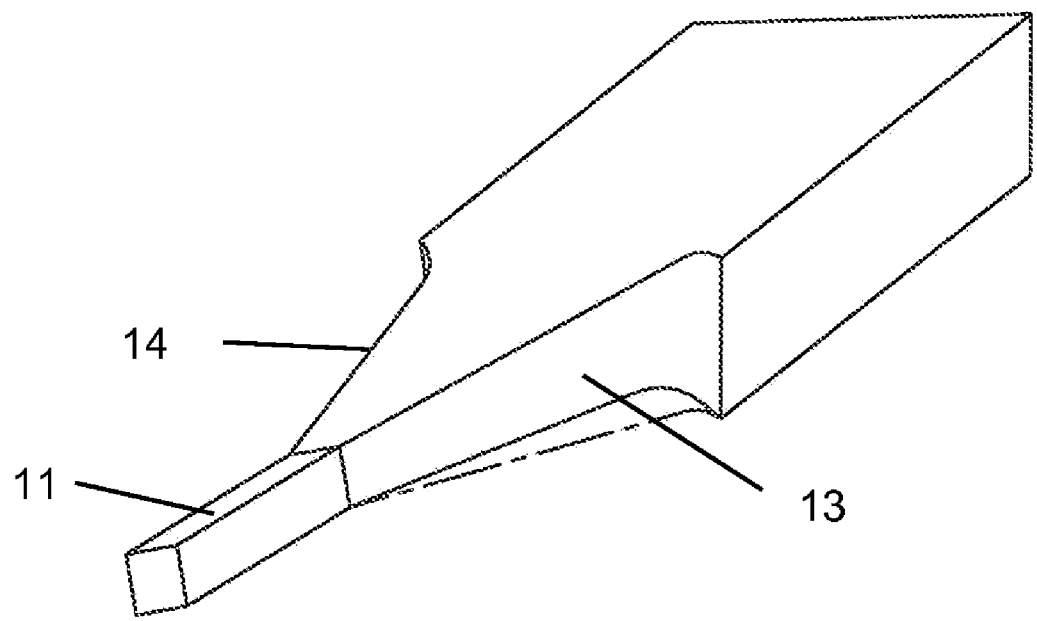
FIG. 10 shows an isometric view of the EDM probe of FIG. 6.

FIG. 5 shows a first embodiment of the electrode of the present invention that forms a convergent film cooling hole. The convergent electrode 10 is shown in FIG. 5 and includes a main support section with a number of film hole forming projections that each include the metering forming section 11 and the diffusion forming section 12. For the convergent sidewall shaped diffusion hole application, the film cooling hole includes a constant diameter cross section 11 at the entrance region which provides cooling flow metering capability follow by a multi-expansion at the metering exit section 12. The multi-expansion is defined as 10 degrees downstream and 10 degrees in the radial outward and radial inward directions for the cooling hole. However, the sidewalls 13 and 14 in the radial expansion direction are angled at convergent angle of 10 to 45 degrees inward. As seen in FIG. 6, the bottom wall of the film hole opening is smaller than the top wall because the two sidewalls 13 and 14 slant outward from bottom to top. This forms a trapezoid shaped diffuser with smaller opening on the hot side next to the mainstream and wider opening next to the blade surface. With this unique film cooling shaping, it achieves an even larger film cooling hole breakout and foot print which translates to better film coverage and yields a better film cooling. The convergent inner sidewalls 13 and 14 reduce the film hole hot gas side breakout thus allowing the film cooling flow to be distributed more at the inner surface of the film cooling hole better. Minimize film layer shear mixing with the hot flow gas and thus yields a higher film effectiveness level. FIG. 10 shows an isometric view of the EDM probe of FIGS. 5 and 6 with the slanted surfaces 13 and 14 for the two side walls that also produce expansion.

Figure 7:
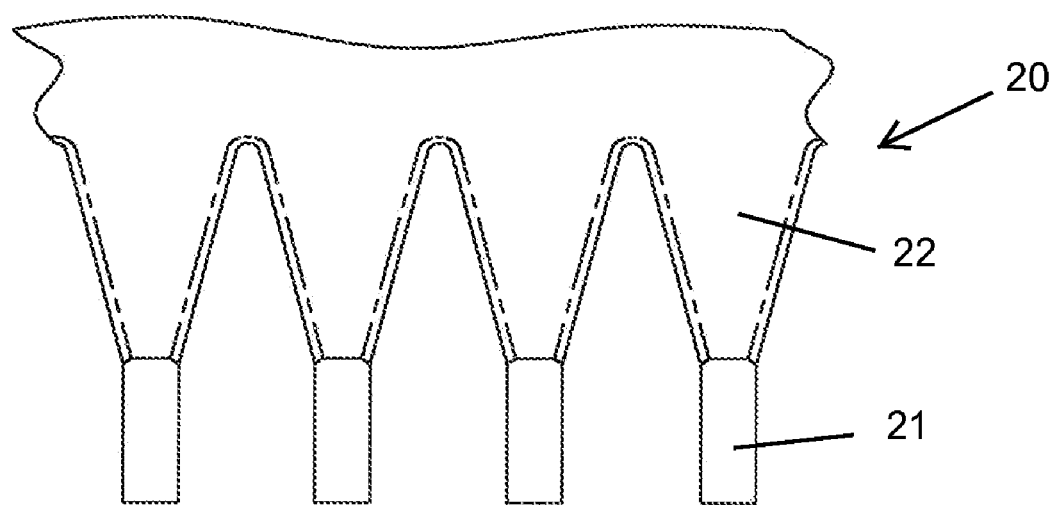
FIG. 7 shows a cross section top view of the divergent electrode of the present invention used to form a film cooling hole.
Figure 8:
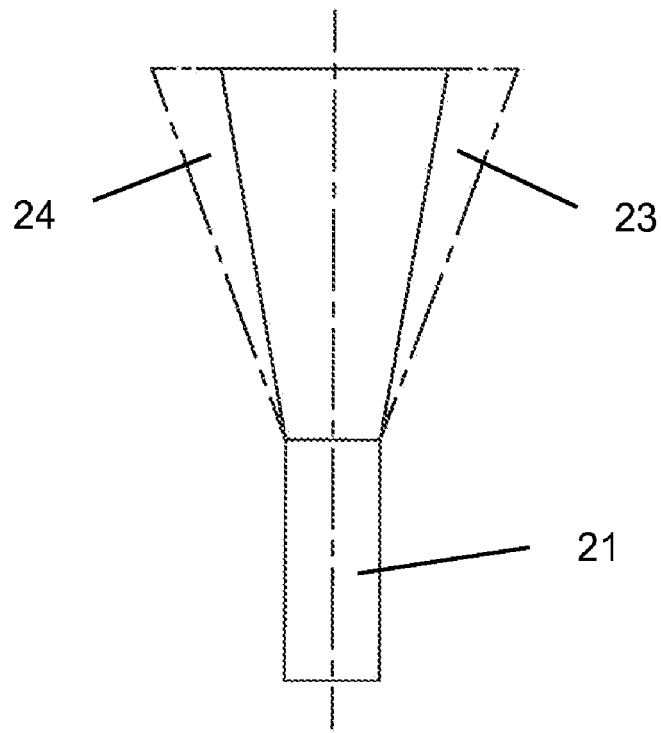
FIG. 8 shows a close-up view of one of the single point divergent electrode of FIG. 7.
Figure 9:
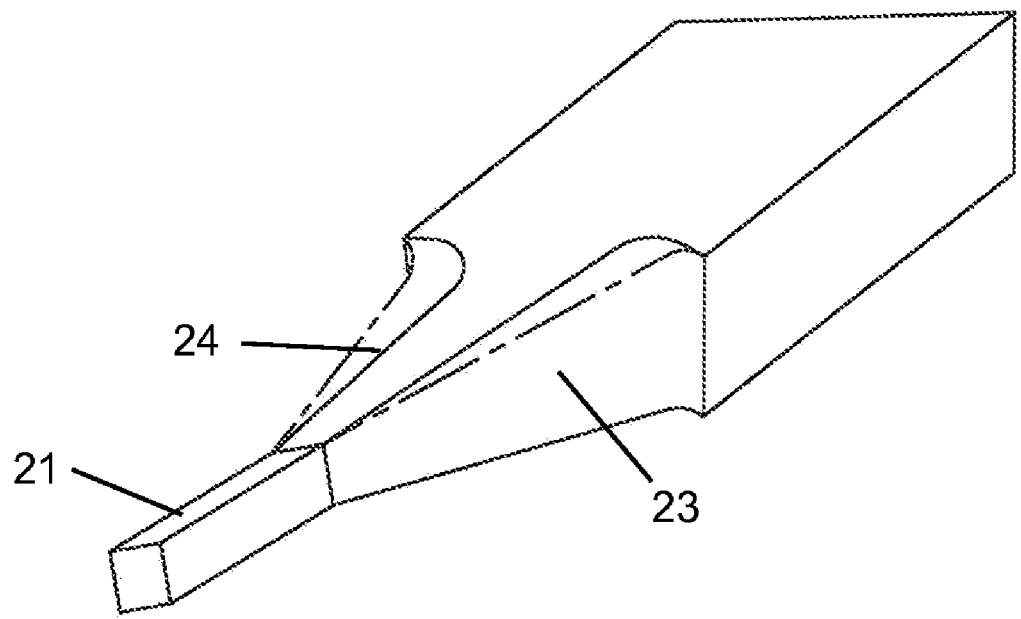
FIG. 9 shows an isometric view of the EDM probe of FIG. 8.

FIG. 7 shows a second embodiment of the electrode of the present invention that forms a divergent film cooling hole. The divergent electrode 20 is shown in FIG. 7. For the divergent sidewall shaped diffusion hole application, the film cooling is comprised with a constant diameter cross section 21 at the entrance region which provides cooling flow metering capability follow by a multi-expansion at the metering exit section 22. Once again, there is no expansion for the film hole on the up-stream sidewall where the film cooling hole is in contact with the hot gas. The multi-expansion is defined as 10 degrees down-stream and 10 degrees in the radial outward and radial inward directions. Furthermore, those sidewalls 23 and 24 in the radial expansion direction are contained additional divergent angle at 10 to 45 degrees. As seen in FIG. 8, the two sidewalls 23 and 24 are slanted inward so that the opening on the top surface is larger than the opening on the bottom surface of the diffusion section. The sidewalls 23 and 24 slant toward the bottom surface which is the opposite of that in the FIG. 5 embodiment. With this unique film cooling shaping, it achieves an even larger film cooling hole breakout and foot print which translates to better film coverage and yields a better film cooling. The divergent inner wall created a smooth ramp surface which allowing the film cooling flow to be spread out the film cooling hole at breakout region better. Minimize film layer shear mixing with the hot flow gas and thus yields a higher film effectiveness level. FIG. 9 shows an isometric view of the EDM probe of FIGS. 7 and 8 with the slanted surfaces 23 and 24 for the two side walls that also produce expansion.

The electrodes 10 and 20 of the present invention are used to form shaped film cooling holes in the airfoils such that the film cooling holes will have the shape of the electrode with the two sidewalls having an expansion and a slant either toward or away from the top side. The airfoils can be aero engine airfoils or IGT engine airfoils. Also, the airfoils can be stator vanes or rotor blades with film cooling holes.

I claim the following:

1. An electrode for forming a film cooling hole in an air cooled turbine airfoil, the electrode comprising:
   a main support section;
   a plurality of film hole forming projections extending from the main support section;
   the projections each including a metering hole forming section and a diffusion forming section;
   the diffusion forming section having a top wall and a bottom wall opposite from the top wall, and two sidewalls;
   the two side walls having an outward expansion and are both slanted toward one of the top wall or the bottom wall.

2. The electrode of claim 1, and further comprising:
   the two side walls slant toward the top wall to produce a convergent expansion of the two sidewalls.

3. The electrode of claim 1, and further comprising:
   the two side walls slant toward the bottom wall to produce a divergent expansion of the two sidewalls.

4. The electrode of claim 1, and further comprising:
   the diffusion section has a trapezoidal shape.

5. The electrode of claim 1, and further comprising:
   the sidewalls have a slanted expansion of from 10 to 45 degrees.

6. The electrode of claim 5, and further comprising:
   the diffusion section has a downstream expansion or around 10 degrees and a radial inward and radial outward expansion of around 10 degrees.

7. The electrode of claim 1, and further comprising:
   the diffusion section has expansion in only three sides.

8. The electrode of claim 7, and further comprising:
   the diffusion section has a zero expansion in the spanwise radial direction.

\* \* \* \* \*